United States Patent [19]

Kim

[11] 4,293,191
[45] Oct. 6, 1981

[54] ADJUSTABLE CONVEX REARVIEW MIRROR

[76] Inventor: Matthew S. Kim, 114 S. 6th St., Bangor, Pa. 18013

[21] Appl. No.: 148,516

[22] Filed: May 9, 1980

[51] Int. Cl.³ .............................................. G02B 5/12
[52] U.S. Cl. .................................. 350/293; 350/303; 248/467; 248/478
[58] Field of Search ............... 350/293, 303, 304, 288, 350/307; 248/477, 478, 475 B, 467

[56] References Cited

U.S. PATENT DOCUMENTS

| | | | |
|---|---|---|---|
| D. 239,932 | 5/1976 | Kim | D12/187 |
| 2,197,280 | 4/1940 | Topping | 350/302 |
| 2,860,545 | 11/1958 | Herr et al. | 248/478 |
| 2,911,177 | 11/1959 | West | 350/293 |
| 3,175,463 | 3/1965 | Seashore | 350/293 |
| 3,375,053 | 3/1968 | Ward | 350/293 |
| 3,957,357 | 5/1976 | Kulikowski | 350/304 |
| 4,052,124 | 10/1977 | Marcus | 350/304 |
| 4,223,983 | 9/1980 | Bloom | 350/293 |

Primary Examiner—Jon W. Henry
Attorney, Agent, or Firm—Roylance, Abrams, Berdo & Farley

[57] ABSTRACT

An adjustable convex rearview mirror comprising a mirror housing carrying a convex mirror and a support housing pivotally coupled to the mirror housing and adapted to be rigidly secured to a planar surface, such as the exterior rearview mirror of a motor vehicle. The mirror housing telescopically receives a part of the support housing therein. The support housing has a cantilever arm thereon with a pin at the distal end. This pin is selectively received in a plurality of apertures in the mirror housing to selectively adjust the angular alignment of the mirror relative to the support housing.

7 Claims, 7 Drawing Figures

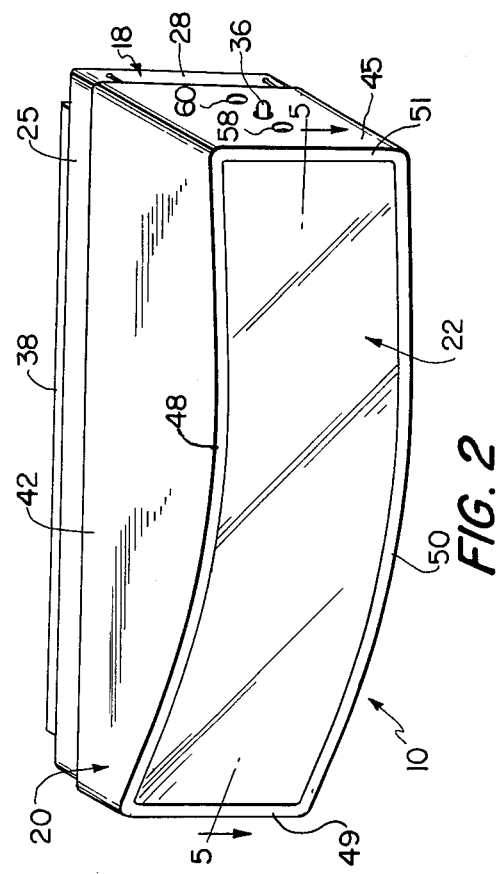
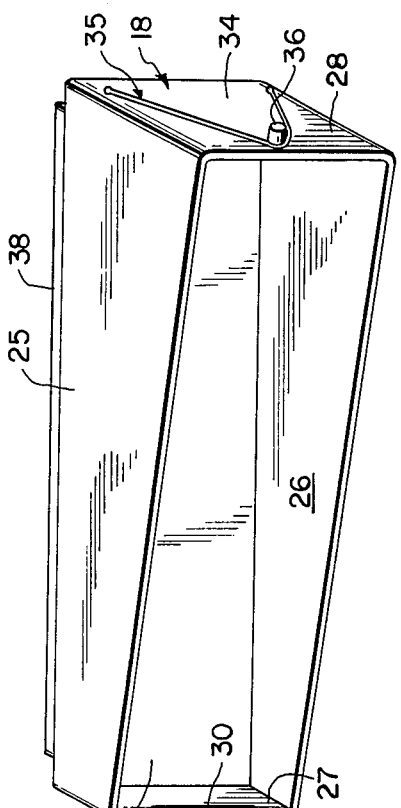
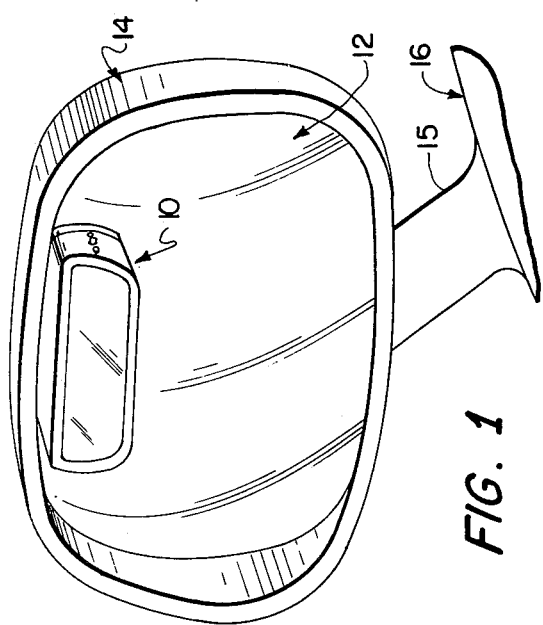
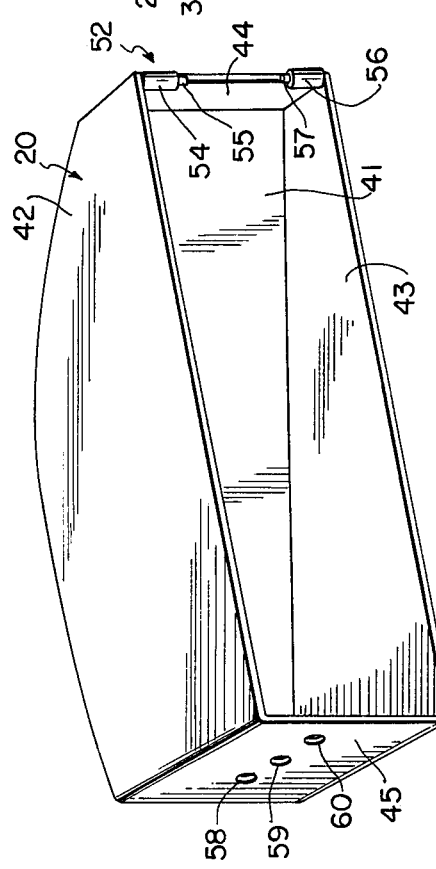

ADJUSTABLE CONVEX REARVIEW MIRROR

FIELD OF THE INVENTION

The present invention relates to an adjustable convex rearview mirror, which is adapted to be supported on, for example, the exterior rearview mirror on a motor vehicle.

BACKGROUND OF THE INVENTION

Numerous devices are known in the prior art that include a convex mirror in association with a planar rearview mirror to provide a wider angle of view for the operator of, for example, a motor vehicle. Typical of these devices are those disclosed in U.S. Pat. Nos. 2,197,280, issued to Topping; 2,911,177, issued to West; 3,175,463, issued to Seashore; 3,375,053, issued to Ward; 3,957,357, issued to Kulikowski; and 4,052,124, issued to Marcus. In addition, U.S. Design Patent Des. 239,932, issued to the inventor herein similarly discloses a combined convex rearview mirror with a planar rearview mirror.

While there has been much work in this field, there is still room for improvement. Thus, many of these prior art devices are expensive to manufacture and are formed from complicated mechanisms. Moreover, many of these prior art devices are not readily adjustable to vary the area of sight of the convex mirror and where the devices are adjustable they are difficult to maintain in the desired adjusted position.

SUMMARY OF THE INVENTION

Accordingly, a primary object of the present invention is to provide an adjustable convex rearview mirror which is cheap to manufacture and is formed in an uncomplicated manner.

Another object of the present invention is to provide such an adjustable convex rearview mirror in which the area of sight is widely adjustable, but once adjusted the mirror readily maintains the desired position.

The foregoing objects are basically attained by providing an adjustable convex rearview mirror comprising a support housing adapted to be rigidly secured to a surface and having a first hinge member at one end and a cantilever arm at the other end with a pin at the distal end of the arm; a convex mirror; a mirror housing having a slot for receiving the periphery of the convex mirror, the mirror housing having a second hinge member at one end hingedly coupled to the first hinge member to hingedly couple the support housing and the mirror housing for adjusting the angular alignment of the mirror relative to the support housing, the mirror housing having a plurality of apertures defined therein at the other end for selectively receiving the pin as the mirror housing is pivoted relative to the support housing about the hinge members, the mirror housing telescopically receiving a part of the support housing therein.

Thus, the adjustable convex rearview mirror comprises merely three parts, that is the support housing, the mirror housing and the convex mirror itself, so it is cheap to manufacture and is simply constructed.

By making the mirror housing pivotally supported and coupled to the support housing, the mirror is easily adjusted to take in a variety of areas of sight. The cantilever arm pin and aperture connection allows for adjustability while providing a secure mechanism so that once adjusted the mirror maintains its desired position.

Other objects, advantages and salient features of the present invention will become apparent from the following detailed description which, taken in conjunction with the annexed drawings, discloses a preferred embodiment of the present invention.

DRAWINGS

Referring now to the drawings which form a part of this original disclosure:

FIG. 1 is a perspective view of an adjustable convex rearview mirror in accordance with the present invention secured on an exterior planar rearview mirror of a motor vehicle;

FIG. 2 is an enlarged perspective view of the mirror in accordance with the present invention seen in FIG. 1;

FIG. 3 is a perspective view from the rear of the mirror housing;

FIG. 4 is a perspective view from the front of the support housing;

DETAILED DESCRIPTION OF THE INVENTION

Figure 5:
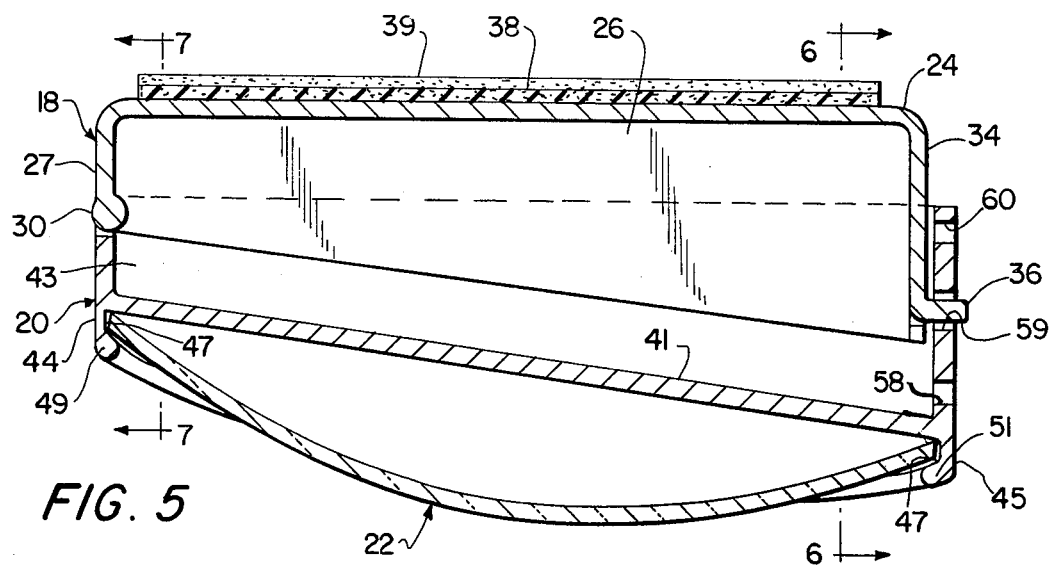
FIG. 5 is an enlarged top plan view of the mirror in accordance with the present invention taken along lines 5—5 in FIG. 2.

As seen in FIG. 1, the adjustable convex rearview mirror 10 in accordance with the present invention is adapted to be rigidly supported on, for example, a planar rearview mirror 12 supported by a housing 14, which is suitably coupled by arm 15 to a part of a motor vehicle 16.

As seen in FIGS. 2-4, the mirror 10 comprises a support housing 18, a mirror housing 20 and a convex mirror 22.

As seen in FIG. 4, the support housing 18 is hollow and comprises five planar walls including a rear wall 24, a top wall 25 coupled to the rear wall, a bottom wall 26 coupled to the rear wall, a first side wall 27 coupled to the rear, top and bottom walls, and a second side wall 28 similarly coupled to the rear, top and bottom walls. The first side wall 27 is at one end of the support housing, while the second side wall 28 is at the other end. The two side walls and the rear wall are substantially rectangular, the side walls being parallel to one another and perpendicular to the top and bottom walls, which are parallel to each other. The top and bottom walls are also substantially perpendicular to the rear wall. The first side wall 27 has a depth less than the depth of the second side wall 28. The front edges of the top and bottom walls thus taper inwardly from the second side wall to the first side wall at an angle of about 5° to 10°.

Figure 7:
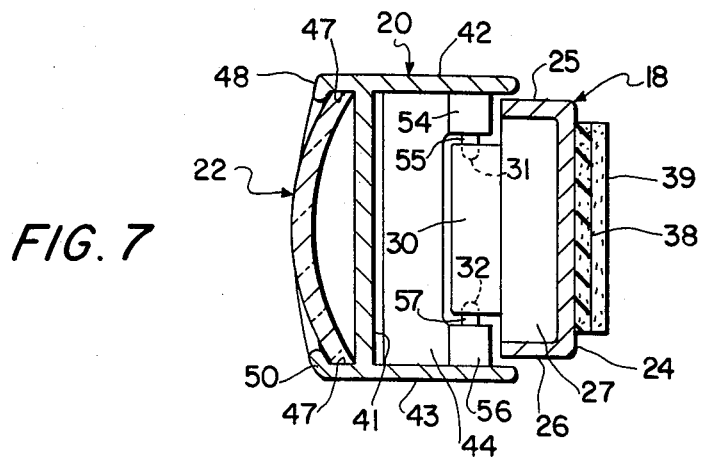
FIG. 7 is a side elevational view in section taken along lines 7—7 in FIG. 5 showing the two hinge members hingedly coupling the mirror housing and the support housing.

As seen in FIG. 4, the support housing 18 has a first hinge member 30 rigidly coupled to the edge of the side wall 27, such as by being integrally formed therewith. The first hinge member 30 is cylindrical and has top and bottom blind bores 31 and 32, extending longitudinally thereof, as also seen in FIG. 7.

At the other end of the support housing 18, as seen in FIG. 4, a cantilever arm 34 is formed in the second side wall 28 by means of a slit 35 formed in the side wall. This slit 35 is substantially V-shaped and tapers inwardly away from the rear wall 24 of the support housing 18. At the distal end of the cantilever arm 34, as seen in FIGS. 4, 5 and 6, a pin 36 extends perpendicularly and outwardly therefrom.

As seen in FIGS. 2, 4, 5, 6 and 7, a foam rubber pad 38 is rigidly secured, such as by adhesive, to the rear wall 24 and has an adhesive layer 39 on the outer surface thereof. This adhesive layer rigidly couples the support housing 18, and therefore the mirror 10, to a planar surface, such as the rearview mirror 12 seen in FIG. 1. This adhesive layer 39 is preferably pressure sensitive and is initially covered by a pealoff protective piece of material until it is desired to couple the mirror 10 to a supporting surface.

The mirror housing 20, as seen in FIGS. 2 and 3, is hollow and comprises five planar walls including a rectangular front wall 41, top and bottom walls 42 and 43 coupled perpendicularly to the front wall, a first side wall 44 coupled to the front, top and bottom walls, and a second side wall 45 coupled to the front, top and bottom walls. The top and bottom walls 42 and 43 are parallel to each other and perpendicular to the first and second side walls 44 and 45, which are parallel to each other. The top and bottom walls 42 and 43 taper inwardly from the second side wall 45 towards the first side wall 44.

Figure 6:
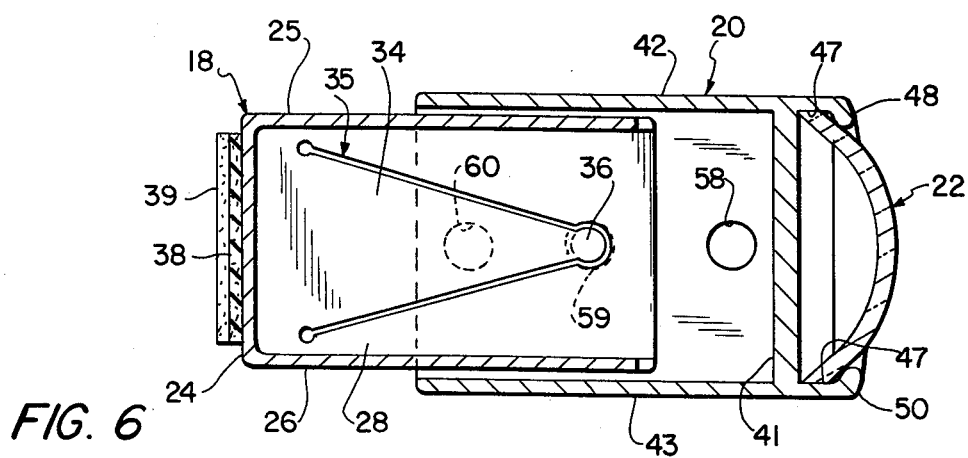
FIG. 6 is a side elevational view in section taken along lines 6—6 in FIG. 5 showing the cantilever arm in the support housing and a plurality of apertures in the mirror housing.

As best seen in FIGS. 2 and 5–7, the convex mirror 22, which is convex both longitudinally and transversely, has a peripheral portion received in a slot 47 which is defined by the rectangular periphery of rectangular front wall 41 and edge extensions 48, 49, 50 and 51 with inward flanges extending respectively from the top wall 42, the first side wall 44, the bottom wall 43 and the second side wall 45. The convex mirror 22, as well as the front wall 41, are at a small acute angle of about 5° to 10° relative to a plane receiving the rear edges of the top and bottom walls 42 and 43 of the mirror housing 20, as best seen in FIG. 5.

As seen in FIG. 3, a second hinge member 52 is formed on the edge of the first side wall 44 of the mirror housing and comprises an upper barrel 54 with a downwardly projecting longitudinal shaft 55 extending therefrom and a lower barrel 56 having an upwardly extending longitudinal shaft 57 extending therefrom.

As seen in FIG. 7, the first hinge member 30 on the support housing 18 is hingedly coupled for relative pivotal movement to the second hinge member 52 on the mirror housing 20. This is accomplished by means of reception, respectively, of shafts 55 and 57 in blind bores 31 and 32.

Referring again to FIG. 3, three apertures 58, 59 and 60 are located in the second side wall 45 in a horizontally extending row.

As seen in FIGS. 5 and 6, the pin 36 extending from cantilever arm 34 is selectively receivable in these apertures to vary the pivotal connection of the mirror housing and the support housing.

Thus, the convex mirror 22 rigidly coupled and supported by the mirror housing 20 can have its angular alignment adjusted relative to the support housing 18 and therefore the surface to which the support housing is coupled. This is accomplished by pushing the pin 36 inwardly so that it is free from any of the apertures and then pivoting the mirror housing relative to the support housing and placing the pin 36 in any other desired aperture. As seen in FIG. 5, the support housing 18 has at least a part telescopically received inside the mirror housing 20 so that a compact structure is formed, as best seen in FIG. 2. This configuration also prevents debris from collecting inside the mechanism of the mirror, which might otherwise effect operation of the adjustability of the mirror. As seen in FIGS. 5 and 6, the support housing 18 has a part of the first side wall 28 and the top and bottom walls 25 and 26 received within the hollow enclosure of the mirror housing 20 defined by the two side walls 44 and 45 and the top and bottom walls 42 and 43. The top and bottom walls of the support housing fit between and are substantially parallel to the top and bottom walls of the mirror housing. The side wall 34 of the support housing is located inside and adjacent side wall 45 of the mirror housing.

Preferably, the entire structure shown in FIG. 4 comprising the support housing 18, other than the pad 38 and adhesive layer 39, is integrally formed from polymeric material or rubber. Similarly, except for the convex mirror 22, the mirror housing 20, as seen in FIG. 3, is integrally formed from polymeric material or rubber.

While one advantageous embodiment has been chosen to illustrate the invention, it will be understood by those skilled in the art that various changes and modifications can be made therein without departing from the scope of the invention as defined in the appended claims.

What is claimed is:
1. An adjustable convex rearview mirror comprising:
a support housing adapted to be rigidly secured to a surface and having a first hinge member at one end and a cantilever arm at the other end with a pin at the distal end of said arm;
a convex mirror;
a mirror housing having a slot for receiving the periphery of said convex mirror;
said mirror housing having a second hinge member at one end hingedly coupled to said first hinge member to hingedly couple said support housing and said mirror housing for adjusting the angular alignment of said mirror relative to said support housing,
said mirror housing having a plurality of apertures defined therein at the other end for selectively receiving said pin as said mirror housing is pivoted relative to said support housing about said hinge members,
said mirror housing telescopically receiving a part of said support housing therein.
2. A mirror according to claim 1, wherein said support housing includes
a rear wall,
top and bottom walls coupled to said rear wall,
a first side wall coupled to said rear, top and bottom walls and having said first hinge member thereon, and
a second side wall coupled to said rear, top and bottom walls and having said cantilever arm thereon.
3. A mirror according to claim 2, wherein
said top and bottom walls taper inwardly from said second side wall to said first side wall.
4. A mirror according to claim 1, wherein said mirror housing includes
top and bottom walls,
a first side wall coupled to said top and bottom walls and having said second hinge member thereon, and a second side wall coupled to said top and bottom walls and having said plurality of apertures therein.

5. A mirror according to claim 4, wherein said mirror housing further includes a front wall coupled to said top, bottom, first side and second side walls, said front wall defining one side of said slot for receiving the periphery of said convex mirror.

6. A mirror according to claim 1, wherein said support housing includes a planar rear wall having adhesive means, coupled thereto, for securing said support housing to a planar surface.

7. A mirror according to claim 1, wherein said support housing includes a planar side wall, said cantilever arm being defined by a slit cut in said side wall.

* * * * *